United States Patent [19]
Kleissler, Jr.

[11] 3,951,630
[45] Apr. 20, 1976

[54] TAPERED TUBULAR FILTER ELEMENT HAVING FLARED OUTLET

[75] Inventor: Edwin A. Kleissler, Jr., Little Silver, N.J.

[73] Assignee: G. A. Kleissler Co., Edison, N.J.

[22] Filed: Oct. 29, 1974

[21] Appl. No.: 518,745

[52] U.S. Cl. .............................. 55/378; 55/341 NT; 55/381; 55/529
[51] Int. Cl.² ........................................ B01D 46/02
[58] Field of Search ............ 55/282, 301, 341, 361, 55/368, 484, 521, 529, 381, 374, 378

[56] References Cited
UNITED STATES PATENTS

| | | | |
|---|---|---|---|
| 589,772 | 9/1897 | Woodbury | 55/341 |
| 1,632,895 | 6/1927 | Hagelthorn | 55/341 X |
| 1,797,812 | 3/1931 | Waring | 55/341 X |
| 2,255,519 | 9/1941 | Preston | 55/341 X |
| 2,474,017 | 6/1949 | Smith et al. | 55/301 |
| 3,457,707 | 7/1969 | Fesco | 55/381 X |
| 3,736,728 | 6/1973 | Kleissler, Jr. | 55/341 |
| 3,771,638 | 11/1973 | Schneider et al. | 55/529 X |

Primary Examiner—Frank W. Lutter
Assistant Examiner—Kathleen J. Prunner
Attorney, Agent, or Firm—Howson and Howson

[57] ABSTRACT

An elongated tubular filter element prevents certain types of fluffy foreign matter entrained in an airstream admitted into the filter element from clogging the outlet of the tube during operation of a separator in which the filter element is installed. A major portion of the length of the tube tapers at a predetermined rate from one end, and a minor portion of the length tapers at a greater rate adjacent the other end of the tube to provide the tube with a flare at one end. The filter element is installed in the separator with its flared end down, so that the foreign matter falls freely through the bottom of the tube during operation of the separator or during cleaning of the tube.

8 Claims, 4 Drawing Figures

U.S. Patent   April 20, 1976   3,951,630
FIG. 1.
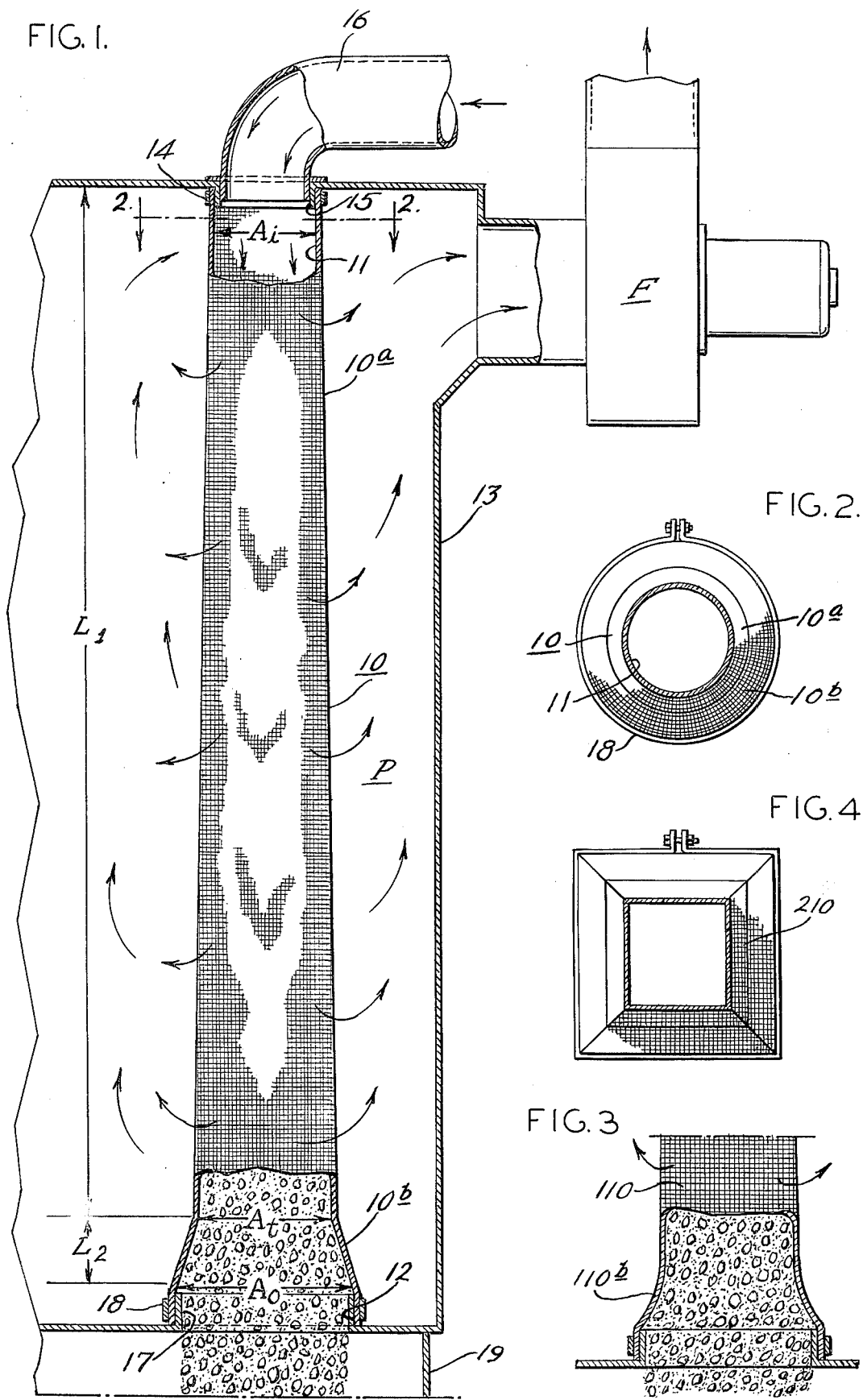
FIG. 2.
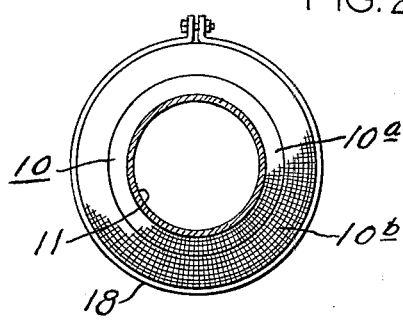
FIG. 4.
FIG. 3.
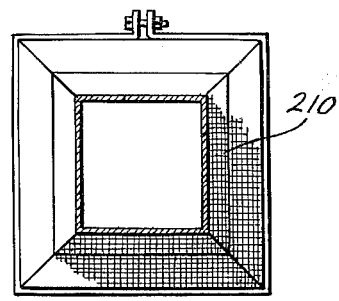

TAPERED TUBULAR FILTER ELEMENT HAVING FLARED OUTLET

The present invention relates to filter elements for use in separators, and more particularly, the present invention relates to improvements in so-called cloth filter tubes for separators.

Separators for removing dust and other foreign particulate matter from air are known. Examples of separators which employ tapered cloth tubes for this purpose are disclosed in the following U.S. Pat. Nos.: 673,547; 1,797,812; and 3,736,728, the latter patent being owned by the assignee of the present application. Although each of the patented separators may function satisfactorily for its intended purpose, there are certain types of airborne particulate matter which are particularly difficult to separate from the air stream in which they are conveyed. For instance, very light and fluffy particles such as plastic films, paper fibers, blends of synthetic material such as rayon and shredded paper pulp fibers, etc., have a proclivity for adhering to the inner surface of the cloth filter, particularly near its outlet where the velocity of flow of the particle-laden air stream is at a minimum when the stream is admitted into the filter tube at its upper end. In the course of operation of the separator, such build-up can cause the outlet to become blocked and to affect adversely the efficiency of the entire separator. Needless to say, a filter tube which ameliorates this situation is highly desirable.

Many separators are provided with means for periodically cleaning the insides of cloth tubes including tube-shaking devices, devices for pulsing air reversely through the tubes, etc. Although such devices function satisfactorily to separate tightly-adherent foreign matter from the inner surfaces of the tubes, certain materials, such as indicated above, tend to agglomerate as they descend. The agglomerates may become sufficiently large as to bulge the sides of the tubes and become wedged therein or hung-up on sharp edges in the tube such as the edge of the bottom tube-mounting ferrule. When this occurs, the separator must be taken off-stream and the blockage removed manually. Accordingly, it should be apparent that a cloth filter tube which can be cleaned thoroughly by automatic means is highly desirable.

With the foregoing in mind, it is a primary object of the present invention to provide a novel filter element for use in a separator.

It is another object of the present invention to provide an improved filter tube which functions to ensure satisfactory operation of the separator in which it is installed, even when separating particulate matter having a proclivity for adhering to the inside of the tube.

As a further object, the present invention provides a filter tube element which is particularly suited for separating, from a gaseous medium, relatively light and fluffy particulate matter which would normally have a tendency to block the outlet of a conventional cloth filter tube.

It is yet another object of the present invention to provide a unique filter tube which is capable of being cleaned thoroughly by automatic cleaning means, even when utilized to separate from a gaseous medium foreign matter having a tendency to agglomerate after being loosened.

More specifically, the present invention provides an elongated tubular filter element having an axial inlet at its upper end and a larger axial outlet at its lower end. A major portion of the length of the element has an area which increases at a predetermined rate in an axial direction from the inlet, and a minor portion of the length of the element adjacent the outlet has an area which increases at a greater rate to provide a flared transition zone between the outlet and the major portion of the length of the tube. Thus, when the tube is installed in a separator, particulate matter entrained in a gaseous medium entering the inlet flows radially outward through the tube and tends to fall freely from the inside of the tube both during operation of the separator and during cleaning of the tube, whereby the particulate matter is prevented from blocking the outlet.

These and other objects, features and advantages of the present invention should become apparent from the following description when taken in conjunction with the accompanying drawings in which:

FIG. 1 is a longitudinal sectional view of a filter tube element embodying the present invention, the view illustrating the filter tube installed in a separator wherein a particle-laden gaseous medium is admitted to the interior of the filter element at its upper end wherein separated particulate matter is discharged from the interior of the tube through an outlet located at its bottom;

FIG. 2 is a sectional view taken along lines 2—2 of FIG. 1;

FIG. 3 is a fragmentary sectional view of a modified embodiment of the filter tube of the present invention; and FIG. 4 is a sectional view, similar to FIG. 2, but of yet another modified embodiment of the present invention.

Referring now to the drawing, the illustrated tubular filter element 10 which embodies the present invention is fabricated of any one of a number of different types of conventional filter materials permeable to a gaseous medium, such as air, but substantially impermeable to particulate matter such as dust, particles of plastic film, loosely associated synthetic and/or paper fibers, etc. The tubular filter element 10 is symmetrical about its longitudinal axis and has an axial inlet 11 at its upper end and an axial outlet 12 at its lower end. The filter element 10 is normally installed in a separator 13 by means of a clamp 14 which constricts the inlet 11 around an inlet ferrule 15. The filter element 10 depends from the inlet ferrule 15, and the outlet 12 of the filter element is secured to an outlet ferrule 17 by means of a clamp or strap 18.

An inlet conduit 16 is connected to the inlet ferrule 15 and to a suction nozzle (not shown) for picking-up loose particulate matter and air. A suction fan F is connected to the separator 13 and operates to reduce the pressure in the plenum P around the filter element 10 for conveying the particle-laden medium to the separator 10 and causing the same to enter the inlet 11. The particle-free air then flows radially outward of the filter element 10 toward the fan F for recirculation to the pick-up location or for exhaust to the atmosphere. The particles separated from the air fall downwardly through the filter element 10 and are collected in the bin 19.

The filter element 10 is customarily installed in the separator with a plurality of like filter elements to form a battery of such elements, the number of elements involved, their size, etc., being determined by customary design considerations. Preferably, the separator is provided with conventional means for removing particulate matter which adheres to the inside of the tube, such as a tube-shaker mechanism, means for reverse pulsing air through the tube, etc.

As described thus far, the separator is conventional.

According to the present invention, the filter tube element 10 is provided with a novel configuration which enables the separator in which it is installed to operate satisfactorily even when used to remove from an air stream light and fluffy matter such as noted above. For this purpose, the filter tube is tapered and provided with a flared lower end. In the embodiment illustrated in FIG. 1, the filter element 10 has a circular cross-section with a diameter which increases at a predetermined rate axially from the upper end 11 for a major portion $L_1$ of the length of the filter element. The rate of increase in diameter is constant so that the major portion $L_1$ of the length of the filter element 10 has a frusto-conical tubular configuration. The filter element 10 has a right cylindrical tubular collar 12 which forms its outlet and which facilitates connection to the outlet ferrule 17, as described heretofore. The filter element 10 has a flare 10b between its major portion 10a and its outlet 12. The flare has a diameter, which increases at a constant rate greater than the corresponding rate at which the diameter of the major portion 10a of the element increases. Thus, the areas also increase at a predetermined non-linear rate. Hence, a transition zone with a straight taper is provided adjacent the outlet 12 of the filter element.

Of course, if desired, a modified filter tube 110 (FIG. 3) may be provided with a diameter in the flared zone 110b which increases at an axially increasing rate rather than the constant rate of increase for the embodiment of FIG. 1. This would cause the transition zone 10b to have a parabolic shape or taper.

Also, in another modified embodiment of the present invention, a filter element 210 is provided with a non-circular or square cross-sectional area such as illustrated in FIG. 4. Since the angle of the taper in the flared transition zone is considerably greater than the taper angle for the major portion of the length of the filter tube, it should be apparent that the area of the filter element in the flared transition zone increases at a greater rate in the axial direction.

In operation, the particle-laden gaseous medium is admitted into the interior of the filter element 10 through the inlet 11, being drawn thereinto by the fan F which lowers the ambient pressure in the plenum P around the filter element 10 and which causes the gaseous medium to flow outwardly. At the top of the filter element 10, the downward velocity of the gaseous medium is at a maximum, and even though the medium is flowing radially outward through the filter element 10, the downward component of the velocity tends to prevent the particulate matter from building up on the inside of the filter element 10 adjacent the inlet 11. As more and more of the gaseous medium exists the filter element 10 along its length, the velocity of the medium downwardly and outwardly decreases. However, because of the flare of the filter element 10 in the transition zone 10b, the flow of gaseous medium radially outward has a component which is directed downwardly along the inner surface of the tube 10 in the transition zone 10b. This component of velocity is believed to assist in sweeping clean the inner surface of the filter element 10 in the transition zone for preventing particulate matter from adhering thereto and aggregating to such an extent as to block the outlet of the tube 10 in the course of operation of the separator.

Furthermore, it is noted that with this structure, the upper edge of the outlet ferrule is located out of the main stream of the descending particulate matter so that there are no sharp edges on which the particulate matter can accumulate either during operation of the separator or during cleaning of the tube. Moreover, a sharply accelerated increase in area is provided just above the fixed restraint of the outlet ferrule. This permits free downward passage through the outlet of an agglomeration of foreign matter which could distend the tube. Thus, even when the particle-laden air is flowed upwardly through the filter tube, rather than downwardly as in the illustrated embodiment, the disposition of the outlet ferrule away from the main stream of downward movement of particulate matter during cleaning ensures thorough cleaning without blockage of the outlet. Thus, the filter tube 10 of the present invention ensures satisfactory operation of the separator in which it is installed.

In designing the filter element 10 and 110, certain dimensional relations are important. For example, the outlet area $A_o$ should be related to the inlet area $A_i$ in a predetermined ratio in a range of between about 1.5:1 to about 3.5:1. The area $A_t$ of the tube 10 adjacent the transition zone 10b is related to the area of the inlet $A_i$ in a predetermined ratio in a range of about 1.1:1 to about 3:1. In addition, the major portion 10a of the tubular element 10 has a length $L_1$ related to the length $L_2$ of the minor portion 10b in a predetermined ratio in a range of between about 66:1 to about 10:1. By way of example, a filter element 10 having a circular cross section constructed according to these parameters would have an 18 inch inlet diameter $D_i$, a 24 inch outlet diameter $D_o$, a 20 inch transition diameter $D_t$, a major portion length $L_1$ of 10 to 11 feet, and a minor portion length $L_2$ of about 6 inches.

In view of the foregoing, it should be apparent that an improved cloth filter tube has been provided for use in separating from gaseous mediums particulate material which heretofore has been particularly difficult to separate satisfactorily because of the proclivity for such material to clog the outlets of conventional cloth filter tubes. Thus a separator having one or more filter tube elements constructed according to the present invention is capable of operating satisfactorily and efficiently with a minimum of maintenance over a prolonged period of time.

While preferred embodiments of the present invention have been described in detail, various modifications, alternations and changes may be made without departing from the spirit and scope of the present invention as defined in the appended claims.

What is claimed is:

1. In combination with a separator having a plenum, means for admitting a particle-laden gaseous medium into said plenum, means for removing separated particles from the plenum, and means for exhausting the gaseous medium from the plenum; at least one elongated tubular filter element mounted upright across said plenum for removing particulate matter from said particle-laden gaseous medium; said filter element being fabricated of a flexible material permeable to said gaseous medium but substantially impermeable to said particulate matter; said filter element being symmetrical about its longitudinal axis and having an open upper end, an open lower end larger than said upper end, and an unobstructed flow passage between said ends; means connecting one of said ends to said admitting means to afford flow of said particle-laden gaseous medium into the interior of said filter element and means connecting the other of said ends to said removing means to afford the discharge from the interior of the filter element of particles separated from the gaseous medium therein when the exhausting means creates an ambient pressure differential around the filter element; said filter element having a cross-sectional area increasing at a predetermined rate in an axial direction from said upper end for a major portion of the length of the element; said filter element also having another cross-sectional area increasing at another greater predetermined rate in said direction for a minor portion of the length of the element to provide said filter element with a flare at said lower end; said major and minor portions of said length being related in a ratio of at least 10:1; so that when said particle-laden gaseous medium is flowed into the filter element, separated particulate matter tends to fall freely through the lower end of the filter element at least during cleaning thereof.

2. Apparatus according to claim 1 wherein both said cross-sectional areas are circular and have diameters, with the diameter of the major portion increasing at a constant rate.

3. Apparatus according to claim 2 wherein the diameter of the minor portion increases to a constant rate to provide the flare with a straight taper.

4. Apparatus according to claim 2 wherein the diameter of the minor portion increases at a non-constant rate to provide the flare with a parabolic taper.

5. Apparatus according to claim 1 wherein the flared minor portion of said filter element terminates in a collar and said separator having a mounting ferrule protruding into said plenum and telescopically received within said collar to mount the lower end of said filter element in said plenum.

6. Apparatus according to claim 1 wherein the cross-sectional areas of both its major and minor portions are non-circular.

7. Apparatus according to claim 1 wherein said open upper end of said filter element is connected to said admitting means so that said particle-laden gaseous medium is flowed downwardly into the interior of said filter element.

8. Apparatus according to claim 1 wherein the upper and lower ends of said filter element each have cross-sectional areas with the area of said lower end being related to the area of the upper end in a ratio in a range of between about 1.5:1 to about 3.5:1, and wherein said filter element has a transition zone with a predetermined cross-sectional area at the junction of said major and minor portions of said length, said transition zone area being related to the upper end area in a ratio of about 1.1:1 to about 3:1.

* * * * *